US012446790B2

(12) United States Patent
Adams et al.

(10) Patent No.: US 12,446,790 B2
(45) Date of Patent: Oct. 21, 2025

(54) PATIENT-WEARABLE DEVICE FOR DETECTING A SUBPULSE OF A PATIENT AND RELATED SYSTEMS, METHODS AND COMPUTER PROGRAM PRODUCTS

(71) Applicant: Dandelion Medical Devices, Inc., Vero Beach, FL (US)

(72) Inventors: Paul Adams, Vero Beach, FL (US); Christopher Vetter, Dublin, OH (US); Alexander Peraire-Bueno, Bedford, MA (US); Michael Andrew Holtman, McLean, VA (US)

(73) Assignee: Dandelion Medical Devices, Inc., Vero Beach, FL (US)

( * ) Notice: Subject to any disclaimer, the term of this patent is extended or adjusted under 35 U.S.C. 154(b) by 0 days.

(21) Appl. No.: 18/416,568

(22) Filed: Jan. 18, 2024

(65) Prior Publication Data
US 2024/0245316 A1    Jul. 25, 2024

Related U.S. Application Data

(63) Continuation of application No. 18/055,052, filed on Nov. 14, 2022.

(51) Int. Cl.
  *A61B 5/024*  (2006.01)
  *A61B 5/00*  (2006.01)
(52) U.S. Cl.
  CPC ...... *A61B 5/02438* (2013.01); *A61B 5/02444* (2013.01); *A61B 5/6833* (2013.01);
  (Continued)
(58) Field of Classification Search
  None
  See application file for complete search history.

(56) References Cited

U.S. PATENT DOCUMENTS

| 5,111,826 A * | 5/1992 | Nasiff ............... A61B 5/025 600/485 |
| 11,116,448 B1 | 9/2021 | Trapero Martin et al. |

(Continued)

FOREIGN PATENT DOCUMENTS

| WO | WO-2014197822 A2 | 12/2014 |
| WO | WO 2018/013569 A1 | 1/2018 |

(Continued)

OTHER PUBLICATIONS

Dellimore, Kiran, et al. "Towards an algorithm for automatic accelerometer-based pulse presence detection during cardiopulmonary resuscitation." 2016 38th Annual International Conference of the IEEE Engineering in Medicine and Biology Society (EMBC). IEEE, 2016. (Year: 2016).*

(Continued)

*Primary Examiner* — Jacqueline Cheng
*Assistant Examiner* — Jairo H Portillo
(74) *Attorney, Agent, or Firm* — WEAVER IP L.L.C.

(57) ABSTRACT

A patient-wearable device for detecting a subpulse of a patient and determining a pulse condition based thereon, and related systems, methods and computer program products. The device includes a base layer comprising a printed circuit board (PCB) and electronics connected thereto, and an adhesive layer connected to the base layer. The electronics may include one or more sensors that generate sensor data, a computer that processes the sensor data to determine the pulse condition of the patient, and a user interface (UI) component that generates a user-perceptible indication of the determined pulse condition. In alternate embodiments, the computer and the UI component may be external to the device and the device may communicate the sensor data to the computer via wired or wireless connection. In further embodiments, multiple devices may be attached to the (Continued)

patient and concurrently transmit raw or processed sensor data to facilitate determination of the pulse condition.

23 Claims, 8 Drawing Sheets

(52) U.S. Cl.
CPC .......... *A61B 5/7225* (2013.01); *A61B 5/7405* (2013.01); *A61B 5/742* (2013.01); *A61B 2560/0214* (2013.01); *A61B 2562/0204* (2013.01); *A61B 2562/0219* (2013.01); *A61B 2562/166* (2013.01)

(56) References Cited

U.S. PATENT DOCUMENTS

| | | | |
|---|---|---|---|
| 11,445,909 | B2 | 9/2022 | Emokpae |
| 2010/0324378 | A1* | 12/2010 | Tran .................. A61B 5/02108 600/300 |
| 2011/0213217 | A1 | 9/2011 | McKenna et al. |
| 2012/0245439 | A1 | 9/2012 | Andre et al. |
| 2014/0303452 | A1 | 10/2014 | Ghaffari |
| 2015/0283390 | A1 | 10/2015 | Sullivan et al. |
| 2015/0290465 | A1 | 10/2015 | Mashiach |
| 2015/0351690 | A1 | 12/2015 | Toth et al. |
| 2016/0310077 | A1 | 10/2016 | Hunter et al. |
| 2017/0027457 | A1* | 2/2017 | Wagle ...................... A61B 5/33 |
| 2017/0251934 | A1* | 9/2017 | Ohno .................. A61B 5/0245 |
| 2018/0153450 | A1 | 6/2018 | Routh et al. |
| 2018/0160955 | A1* | 6/2018 | Lin .................. A61B 5/14552 |
| 2019/0022400 | A1 | 1/2019 | Kumar et al. |
| 2019/0117091 | A1 | 4/2019 | Reunamaki et al. |
| 2019/0208363 | A1* | 7/2019 | Shapiro ................ A61B 5/0205 |
| 2019/0388056 | A1* | 12/2019 | Rodriquez ........... A61B 8/4236 |
| 2020/0113472 | A1* | 4/2020 | Mandel-Portnoy .... G16H 10/60 |
| 2020/0129077 | A1 | 4/2020 | Rogers et al. |
| 2021/0059586 | A1* | 3/2021 | Marriott ............... A61B 5/7225 |
| 2021/0093876 | A1 | 4/2021 | Montague et al. |
| 2022/0054008 | A1 | 2/2022 | Venkatraman et al. |
| 2023/0048327 | A1* | 2/2023 | Lampe .................. A61B 8/488 |
| 2023/0114876 | A1 | 4/2023 | Brincat et al. |

FOREIGN PATENT DOCUMENTS

| | | |
|---|---|---|
| WO | WO-2018136462 A1 | 7/2018 |
| WO | WO-2019161277 A1 | 8/2019 |

OTHER PUBLICATIONS

International Search Report and Written Opinion for International Application No. PCT/US2022/80030, mailed on Feb. 17, 2023, 14 pages.

Vetter, Christopher, "The Resurrection of the Pulse Check," Emergency Medicine News, Jun. 27, 2023.

Butts, Christine, "Treatment for a Subpulse May Not Be CPR," Emergency Medicine News, Sep. 2023.

International Search Report and Written Opinion for International Application No. PCT/US2024/038989, United States Patent and Trademark Office, Alexandria, VA, mailed on Oct. 21, 2024, 23 pages.

International Search Report and Written Opinion for Application No. PCT/US2024/038289, mailed on Oct. 21, 2024, 23 pages.

* cited by examiner

PATIENT-WEARABLE DEVICE FOR DETECTING A SUBPULSE OF A PATIENT AND RELATED SYSTEMS, METHODS AND COMPUTER PROGRAM PRODUCTS

CROSS-REFERENCE TO RELATED APPLICATIONS

This application is a continuation of U.S. patent application Ser. No. 18/055,052, filed Nov. 14, 2022, the entirety of which is incorporated by reference herein.

BACKGROUND

Manual palpation of a pulse, also referred to as a pulse check, is the hallmark of cardiopulmonary resuscitation. Despite its simplicity, few people can accurately determine whether a patient is pulseless within an appropriately short period of time. Studies show that medical practitioners' success rates in rapidly performing a carotid pulse check on a pulseless patient is only in the upper teens (17%), while overall trained medical professionals generally are 55% accurate in manually palpating the presence of a pulse. Further, pulse palpation on individuals on extracorporeal devices has been shown to be only around 78% accurate with a mean time to decision at just over 20 seconds. It has also been reported that only 2% of first responders are able to recognize a truly pulseless patient within 10 seconds of evaluation, while 45% of first responders took 30 seconds to incorrectly determine a patient to be pulseless.

Because the medical mantra "time is tissue" pushes the medical community to minimize time to diagnosis, inaccurate and lengthy pulse detection presents a dilemma for cardiac resuscitation. The hallmark of a common cardiac rhythm during cardiopulmonary resuscitation, pulseless electrical activity (PEA), is in fact reliant on the detection of a pulse while still visualizing non-perfusing cardiac rhythm on a cardiac monitor. Discordance between a failure to palpate a pulse and the presence of a pulse leads to incorrect treatment management, prolongation of rhythm checks, or even abandonment of resuscitative efforts leading to patient death.

The most common locations for pulse palpation in a critically ill patient are the carotid arteries in the neck and the femoral arteries in the groin. Advanced Trauma Life Support (ATLS) guidelines support that a carotid pulse is palpable at a systolic blood pressure (SBP) of 60-70 mmHg and a femoral pulse at a SBP of 70-80. There are instances, however, where SBP is less than a reliably palpable level and as low as 42 mmHg and 52 mmHg, respectively. Critically, this discrepancy may cause providers to stop resuscitation and pronounce a patient dead with no palpable pulse even though the patient may simply have SBP less than 60 mmHg, and has a blood pressure that is perfusing organs. This scenario exemplifies the clinical "subpulse"—i.e., a spectrum of pulse that is less than reliably manually palpable. Such a patient with cardiac activity and a subpulse needs immediate vasopressor support and additional resuscitation, and not the standard resumption of compressions or cessation of resuscitation, both of which can cause harm. Apart from low SBP, accuracy of pulse and subpulse palpation is further dramatically affected by body habitus, provider experience, environmental stress, and strength of pulse which is directly related to blood pressure but also preexisting vascular disease.

While manual palpation of a pulse remains the guideline standard, recent advancements with use of doppler ultrasound have encouraged some practitioners to use such devices to determine the presence of a pulse. This has been shown to increase pulse detection accuracy to higher levels. Doppler ultrasound usage, however, presents two key problems. First, it requires an appropriate ultrasound unit to be on hand when a pulse check situation arises, and second, use of the ultrasound requires a dedicated practitioner, which keeps that practitioner from other resuscitation activities. Use of optical sensors in pulse oximeters is another recent development with the capability to monitor a host patient blood data, including pulse. Multiparameter patient monitor systems employing optical sensors, which typically display the pulse rate, are insufficient alone for pulse checks or in situations with decreased vascular flow. In particular, optical sensors are not adequate for detecting the subpulse. Optical sensors for medical utilization function during optimal conditions, such as minimal subcutaneous tissue between sensor and vessel (radial artery, fingertips, nasal, earlobe), and consistent strength of arterial pulse. Optical sensors are suboptimal/fail with decreased pulse strength and non-perfusion rhythms within the range of subpulse. Patient variability in blood pressure (strength of pulse), body mass, peripheral vascular disease, skin pigmentation and accessible vascular access limit the reliability of optical sensors and, critically, the unreliability or failure of optical sensors to detect subpulse.

Additionally, the determination of a strength and/or presence of a pulse is a common and vitally important examination practice in patients with peripheral vascular disease, which inflicts over 8 million people in the United States and 200 million globally and is the manifestation of systemic atherosclerosis that progressively occludes arteries with atherosclerotic plaque. A common and important practice is palpation of peripheral pulses during each doctor's evaluation. A decreased or absent pulse from the baseline pulse can be a medical emergency and represent near or total vascular occlusion. Typically, a practitioner will initially attempt to palpate a pulse, however the nature of vascular disease significantly decreases the blood flow to the distal artery, leading to decreased pulse strength and difficulty with manual pulse palpation. A provider may inaccurately reason the pulse is absent, however a subpulse may in fact be present. Current standard of care involves using a Doppler ultrasound machine to methodically locate a subpulse. This can be time and labor intensive, and have significant provider variability, as small Doppler surface area requires precise knowledge of arterial location. Further, the force applied with the Doppler can occlude the pulse that leads to inaccurately concluding the absence of a pulse, and the low strength of a subpulse is reliant on the provider hearing the acoustic signal of the Doppler, which is further limited by loud and chaotic environments.

Overall, the current standards for pulse detection and subpulse detection in particular are inaccurate, subjective, and burdensome, the results of which can lead to inappropriate medical decisions and patient harm, especially with critically ill patients.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A patient-wearable device is described herein for detecting a subpulse of a patient and determining a pulse condition based thereon, as well as related systems, methods and computer program products. In an embodiment, the patient-wearable device includes a base layer comprising a printed circuit board (PCB) and electronics connected thereto, and an adhesive layer that is connected to the base layer, the adhesive layer comprising an adhesive suitable for attaching the patient-wearable device to a location on a body of the patient. The electronics may include one or more sensors that generate sensor data, a computer that is connected to the one or more sensors and processes the sensor data generated thereby to determine the pulse condition of the patient, and a user interface (UI) component that is connected to the computer and controlled thereby to generate a user-perceptible indication of the determined pulse condition. In alternate embodiments, the computer and the UI component may be external to the patient-wearable device and the patient-wearable device may communicate the sensor data to the computer via a wired or wireless connection. In further embodiments, multiple patient-wearable devices may be attached to the patient and concurrently transmit raw or processed sensor data to determine the pulse condition.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
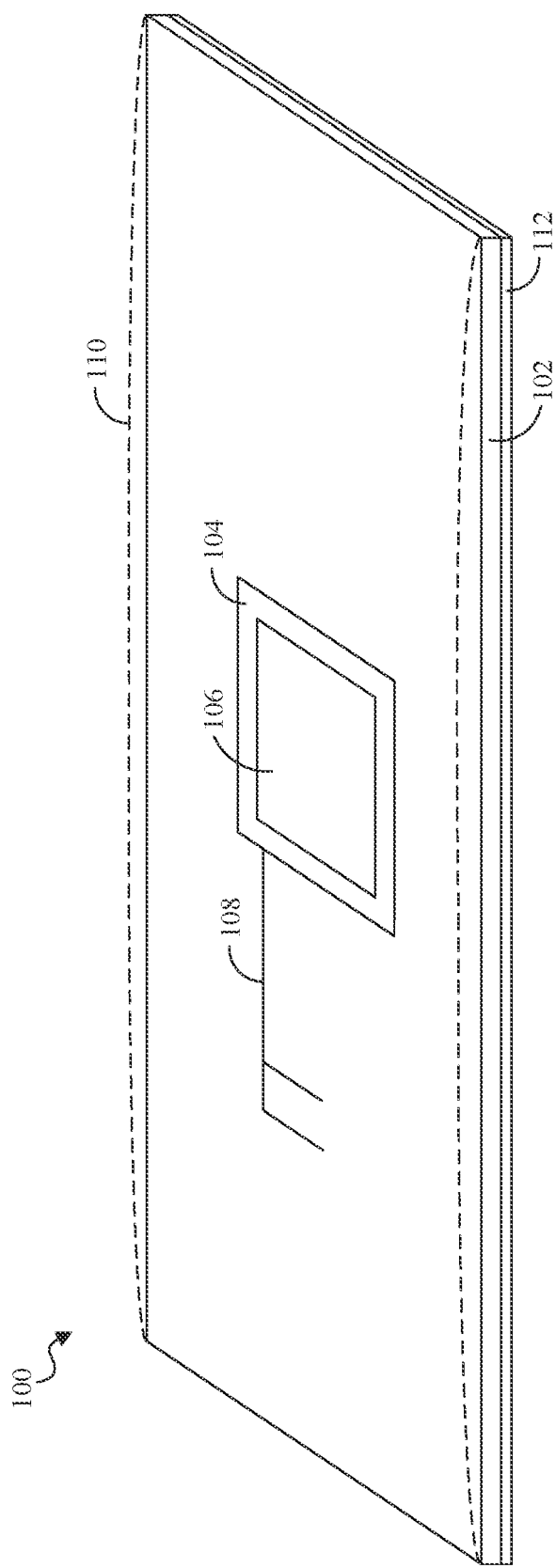
FIG. 1 illustrates a perspective view of a patient-wearable device for detecting a pulse condition of a patient in accordance with an embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS

I. Introduction

The following detailed description discloses numerous example embodiments. The scope of the present patent application is not limited to the disclosed embodiments, but also encompasses combinations of the disclosed embodiments, as well as modifications to the disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

References in the specification to "one embodiment," "an embodiment," "an example embodiment," "another embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

The various embodiments set forth herein are described in terms of exemplary block diagrams and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section may be combined with any other embodiments described in the same section and/or a different section.

II. Example Embodiments

Figure 2:
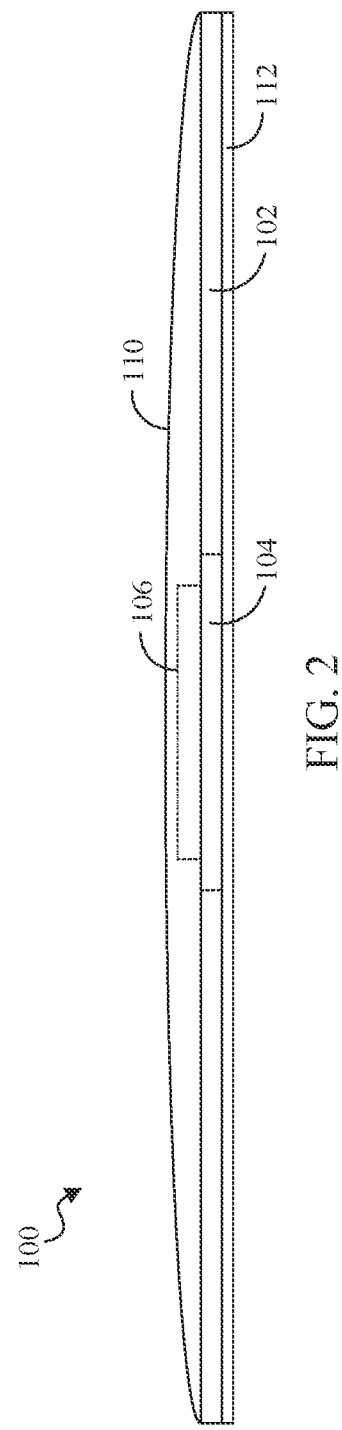
FIG. 2 illustrates a side view of the device shown in FIG. 1.

FIG. 1 illustrates a perspective view of a patient-wearable device 100 for detecting a pulse condition of a patient in accordance with an embodiment. As used herein, the term "pulse condition" is intended to at least encompass the presence or absence of a pulse, as well as any characteristics of a detected pulse (e.g., pulse strength) or any characteristics or conditions determinable based on a detected pulse or absence thereof (e.g., heart rate, or presence of an occlusion). FIG. 2 illustrates a side view of device 100.

Device 100 is capable of detecting pulses of various strengths but, importantly, is capable (both through choice of sensor(s) and through post-processing of sensor data, as will be described herein) of detecting subpulses. As used herein, the term "subpulse" refers to a spectrum of pulse that is less than reliably manually palpable. As discussed in the Background Section above, the failure to accurately detect a pulse or determine the absence of a pulse can lead to inappropriate medical decisions and patient harm, especially with critically ill patients.

Device 100 may be of any practicable size as deemed desirable or suitable for a particular application, though it will generally be desirable to have the smallest size useful. As shown in FIGS. 1 and 2, device 100 is rectangularly-shaped. However, embodiments of device 100 can be of any shape. For example, device 100 may be triangular, square, round, oval, or irregularly shaped in nature such as a star configuration or web configuration, which may be optimal for certain procedures. It may be that device 100 is associated with a larger surface area attachment than that shown in FIG. 1 for a desired pulse condition detection. A larger attached system may also contain multiple devices within it that perform the same or separate function as described herein in reference to device 100.

Device 100 comprises a flexible printed circuit board (PCB) 102. Flexible PCB 102 may be a two-layer PCB—however, this is an example only and flexible PCB 102 may comprise only a single layer or more than two layers. As shown in FIGS. 1 and 2, device 100 also includes electronics 106 that are mounted on or otherwise connected to PCB 102. As will be discussed herein, electronics 106 includes one or more sensors and may also include a microcontroller (e.g., for processing sensor data and/or transmitting unprocessed or processed sensor data to an external device or system), and a power source such as a battery. As further shown in FIG. 1, flexible PCB 102 comprises a stiffener 104 in a region thereof to which electronics 106 are connected. Stiffener 104 may provide improved stability and support for electronics 106. Stiffener 104 may be implemented using a material such as FR4, polyamide, aluminum or stainless steel, although these are only examples and are not intended to be limiting. Stiffener 104 may be attached to PCB 102 using thermal bonding, pressure sensitive adhesives, or any other suitable attachment method.

Device 100 further includes an antenna 108 formed on or connected to flexible PCB 102 for enabling unidirectional or bidirectional communication between device 100 (e.g., a microcontroller of device 100) and one or more external devices. Antenna 108 may comprise, for example, a trace antenna that is formed directly on the surface of flexible PCB 102 or a ceramic chip antenna that is mounted on PCB 102.

An overlay 110 to flexible PCB 102 may further be provided and can include any materials that will not interfere with the functioning of electronics 106 and antenna 108, and may protect electronics 106 and antenna 108. In one embodiment, overlay 110 is composed of silicone, although other materials may be used. The thickness of device 100 can vary and may be dictated by a size of a largest contained component, such as a battery, if included. However, it may be deemed desirable to maintain a thinnest thickness achievable for improved flexibility—accordingly, in some embodiments of device 100, such thickness can be in the millimeter(s) range.

In an alternate embodiment of device 100, flexible PCB 102 may be replaced by a flexible base sheet and a smaller semi-rigid PCB (single-layer or multi-layer) may be disposed (e.g., centrally) thereon or therein to support electronics 106. Such semi-rigid PCB may be square shaped, although other shapes may be used. Such semi-rigid PCB may be sufficiently small such that it can align with the contours and surface of a body part to which device 100 is applied. For example, such a semi-rigid PCB may be in the range of 5 to 50 mm square, and in certain embodiments may be in the size range of a 10 to 20 mm square. However, these are merely examples, and the semi-rigid PCB may be several hundred mm square, or other sizes suitable for an intended application. In an embodiment that includes the semi-rigid PCB, the flexible base sheet may support and/or surround the semi-rigid PCB. The material used in the flexible base sheet may be any suitable material for practicing embodiments described herein. The size of flexible PCB 102 or the flexible base sheet may be determined based on factors such as but not limited to increasing adhesion or achieving desired acoustical properties.

As further shown in FIG. 1, device 100 comprises an adhesive layer 112 that enables device 100 to be affixed to the body (e.g., the skin) of a patient. Adhesive layer 112 may comprise, for example and without limitation, a ready-for-use adhesive pad or film. The adhesive used for adhesive layer 112 can be any conventional adhesive appropriate for contact with a patient's skin. In certain embodiments, the adhesive used may also be conductive so as to enable or increase coupling between one or more sensors of device 100 and the patient. Although device 100 is shown as including adhesive layer 112 for affixing device 100 to a body of a patient, other alternative or additional means of maintaining contact between device 100 and a body of the patient can be used. For example, device 100 may be secured to the body using one or more of suction, cuffs, bands, ties, sprays, gravity, clips, etc., so long as interference with the sensors of device 100 is sufficiently low that a desired pulse condition detection function can be achieved.

In embodiments, adhesive layer 112 comprises a replaceable adhesive pad or film that may be attached to device 100 prior to application to a patient. The replaceable adhesive pad or film may be sterile. For example, the adhesive pad or film may be a pre-sterilized disposable component manufactured from relatively inexpensive materials. The pre-sterilized disposable component may be pre-packaged in a suitable packaging material that can be opened at time of use. In accordance with such an embodiment, when a use of device 100 with a particular patient is completed, the pre-sterilized disposable component may be discarded.

Although adhesive layer 112 is shown as being attached to the bottom of PCB 102 in FIG. 1, in alternate embodiments adhesive layer 112 may be disposed across the top of PCB 102 and extend off the sides thereof, or may surround PCB 102 and extend from the sides thereof, so long as adhesive layer 112 is connected (directly or indirectly) to PCB 102 and is enabled to come into contact with a patient's skin such that it can secure PCB 102 thereto.

The aforementioned base sheet and/or adhesive layer 112 of device 100 may be embedded with an additional matter to support device functioning. For instance, the base sheet may be impregnated with electrically conductive material, such as a flexible wire mesh or conductive adhesive, that aids in sensing. An embodiment may be adapted for ECG monitoring. Further, the presence of conductive material in the base sheet or adhesive layer 112 may further aid in communication of device 100 with other devices or external computers. In a still further example, device 100 may utilize the additional material within the base sheet or adhesive layer 112 as a mechanism by which a primary sensor functioning can be amplified. In this scenario, the added material may act to increase the surface area of a primary sensor and its contact points with the body of the patient. Materials in the substrate, or structures on device 100, may also be used to amplify the signal, such as in the case of vibration or sensing done with an accelerometer.

Figure 3:
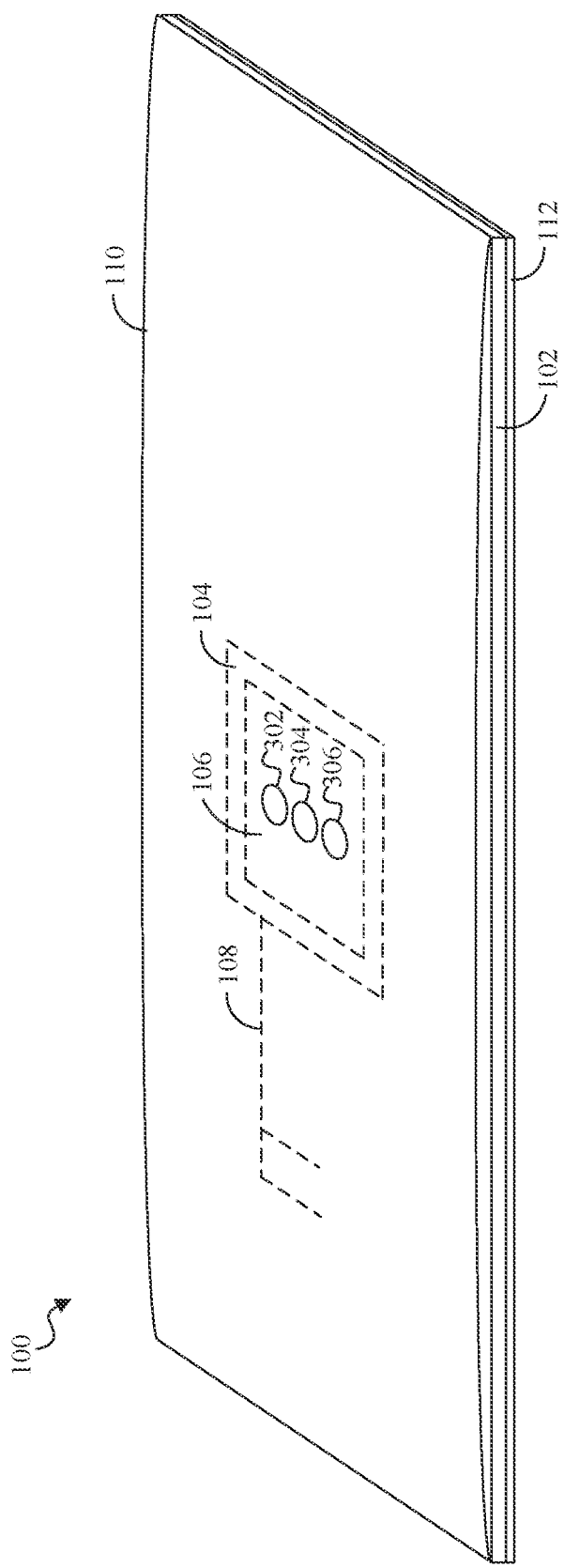
FIG. 3 illustrates a perspective view of a patient-wearable device for detecting a pulse condition of a patient that includes at least one light emitting diode (LED) indicator in accordance with an embodiment.

FIG. 3 illustrates a perspective view of an embodiment of device 100 that includes a number of light emitting diode (LED) indicators 302, 304 and 306 in accordance with an embodiment. Although the embodiment shown in FIG. 3 includes three LED indicators, it should be understood that device 100 may include any number of LED indicators as deemed necessary or desirable. Each LED indicator 302, 304 and 306 may be disposed on top of overlay 110 or may be partially or fully disposed in a cavity formed therein, so long as the LED indicator is visible to a practitioner. Furthermore, each LED indicator 302, 304 and 306 may be connected to flexible PCB 102 via a corresponding channel in overlay 110 such that the LED indicator can be powered on or off or otherwise controlled by other component(s) within electronics 106 (e.g., by a microcontroller within electronics 106).

Such LED indicator(s) may be used to for a variety of purposes, such as but not limited to visually indicating a pulse condition of the patient or signifying a status of device 100. A status of device 100 may include, for example, detecting a pulse, streaming (e.g., streaming sensor data to an external computer), powered on, powered off, sleeping (when device 100 supports a low-power sleep mode), functioning, malfunctioning, or the like. Different pulse conditions or statuses may be indicated by using different colors, illumination patterns, degrees of illumination, and/or numbers of LEDs activated.

Figure 4:
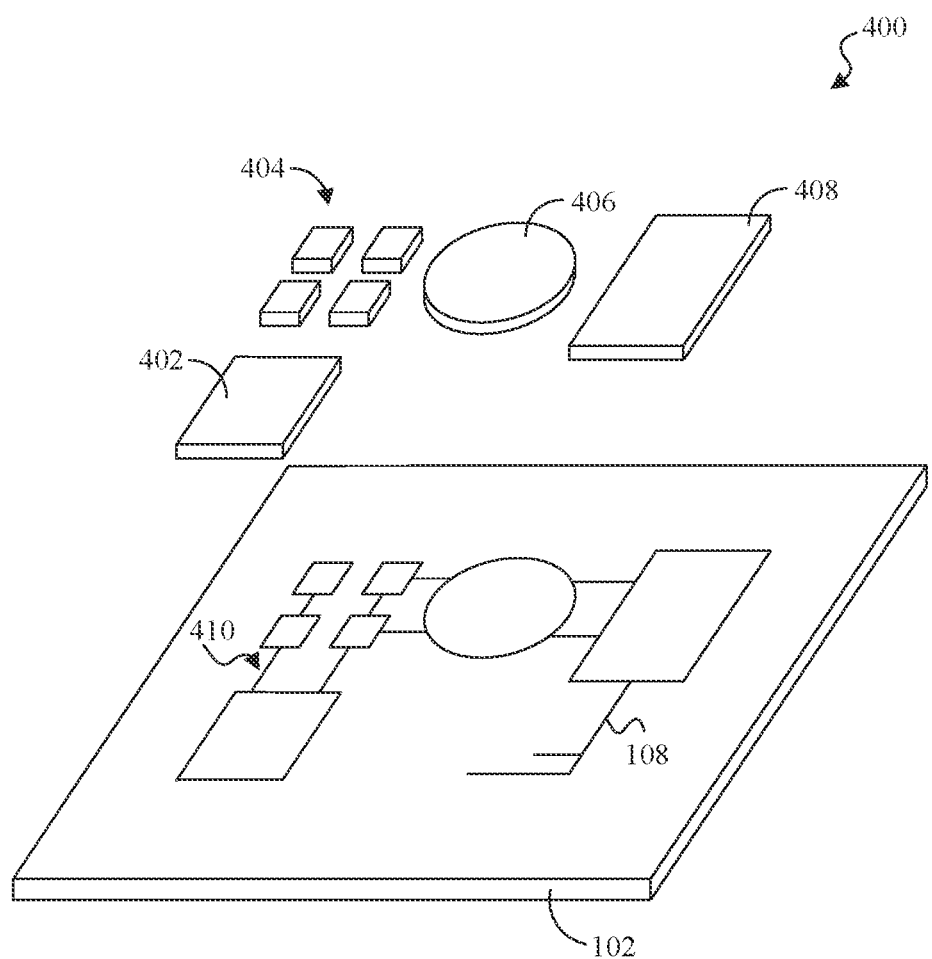
FIG. 4 illustrates an exploded view of an electronic assembly of a patient-wearable device for detecting a pulse condition of a patient in accordance with an embodiment.

FIG. 4 illustrates an exploded view of an electronic assembly 400 that may be used to implement electronics 106 of device 100 in accordance with one example embodiment. As shown in FIG. 4, electronic assembly 400 includes a number of components that are connected to flexible PCB 102 (e.g., on stiffener 104 of flexible PCB 102) and also electronically connected to each other via a number of PCB traces formed on flexible PCB 102, collectively denoted PCB traces 410. These components include a sensor 402, a number of passive electronic components 404, a battery 406, a microcontroller 408, and antenna 108.

Sensor 402 may comprise any type of sensor suitable for detecting a pulse condition in a patient. In an embodiment, sensor 402 comprises an inertial measurement unit (IMU) that integrates one or more of a multi-axis accelerometer or multi-axis gyroscope and that provides suitable sensitivity to detect a desired pulse in a patient. In another embodiment, sensor 402 comprises an acoustic sensor. However, these are merely examples and other types of sensors may be used for detecting a desired pulse in a patient.

Although only a single sensor 402 is shown in FIG. 4 for the sake of illustration, it is to be understood that device 100 may contain any number of sensors that aid directly in pulse condition detection, or in the detection of other patient qualities or conditions. For example, device 100 may include a primary sensor of a first type (e.g., an IMU) and one or more additional sensors of a second type (e.g., acoustic sensors) that may be used to provide further sensing capabilities and/or to provide checks on the primary sensor. In certain settings, combined data, such as that from both inertial and acoustic sensing, may give enhanced data fidelity because information from each type of sensing is fundamentally different. In yet another embodiment, device 100 may comprise multiple sensors of a same type. For example, device 100 may comprise a plurality of physical accelerometers, each of which generates its own sensor data.

In embodiments, the sensors utilized by device 100 may comprise any one of the following sensor types having a sensitivity (alone or combined with other sensors) suitable for detecting a subpulse: an accelerometer, a gyroscope, a magnetometer, an IMU that comprises one or more of an accelerometer, a gyroscope or a magnetometer, or an acoustic sensor.

As noted above, device 100 may also include sensors for detecting patient qualities or conditions other than a pulse condition. For example, device 100 may include sensors for detection of one or more of blood pressure, blood sugar, blood oxygen (e.g., a pulse oximeter), echocardiogram, body temperature, respiratory rate, blood flow rate, magnetic fields, or the like.

Passive electronic components 404 comprise circuit components that do not require a power source (such as resistors, capacitors, inductors, and the like) and that are used to control the flow of power and electrical signals to the other electronic components that make up electronic assembly 400.

Battery 406 comprises a power source for active electronic components within electronic assembly 400. For example, battery 406 may be used to provide power for sensor 402 and microcontroller 408. In one embodiment, battery 406 comprises a button cell battery, although this is only one example.

Microcontroller 408 comprises an integrated circuit (IC) chip that implements a computer configured to perform various functions relating to detecting a pulse condition in a patient as will be described herein. In an embodiment, microcontroller 408 is wireless-enabled and thus may communicate wirelessly with one or more external devices (e.g., for the purpose of communicating sensor data and/or other information). For example, microcontroller 408 may be capable of communicating with other devices via a Bluetooth® protocol (e.g., as specified by the IEEE 802.15.1 standard), a Wi-Fi® protocol (e.g., as specified by the IEEE 802.11 family of standards), and/or other radio frequency (RF) protocol. Hospital settings may dictate a preferred form of wireless communication for device 100; however, Wi-Fi® is believed to be sufficiently robust in most clinical settings so as to not interfere with other patient devices or equipment.

In various embodiments, device 100 may include a microprocessor, a digital signal processor (DSP), or an application-specific integrated circuit (ASIC) instead of microcontroller 408, or in addition to microcontroller 408, for performing processing tasks.

As shown in FIG. 4, to facilitate the aforementioned wireless communication, electronic assembly 400 includes antenna 108 that is connected to microcontroller 408. In the embodiment shown in FIG. 4, antenna 108 comprises a trace antenna that is formed directly on flexible PCB 102 in a well-known manner. However, this is an example only, and antenna 108 may comprise a ceramic chip antenna or other suitable type of antenna.

In an alternate embodiment, device 100 may be capable of communicating with an external device via a wired connection. For example, in an embodiment, device 100 does not include microcontroller 104 but instead communicates sensor data to an external computer via a wired connection thereto. Such external computer may comprise, for example, and without limitation a microcontroller (e.g., an Intel® 8051 microcontroller), a microcontroller board (e.g., an Arduino® microcontroller board), or a microprocessor-based mini-computer (e.g., a Raspberry Pi® microprocessor-based mini-computer). In an alternate embodiment, the communication of the sensor data to the external computer is carried out via a wireless connection. In still further embodiments, device 100 may include microcontroller 104 and also communicate with an external computer via a wired and/or wireless connection thereto.

Embodiments of device 100 can be applied in all clinical settings, including for use during cardiopulmonary resuscitation (CPR), during cardiac arrest (code), or the moments just prior to or after cardiac arrest (peri-code), on patients with or without forms of vascular disease that impact pulse detection, to detect the presence of a pulse in an extremity for cases of concern for arterial clot, or pulse/heart rate detection in persons, including fetal heart rate/pulse.

In an embodiment, device 100 is suitable for use on a patient for an extended period of time, such as the duration of a stay at a hospital. For example, device 100 may be adapted to have a relatively large internal battery power source, be wired to an external power source, and/or enter an energy-saving rest mode during periods of non-use for activation when a pulse check is required. As another example, adhesive layer 112 may comprise a material that provides for long-term adhesion. Such long-term adhesion could be valuable during hospitalization or for telemedicine to determine dynamic changes of a pulse in real time for immediate provider notification. The clot of an artery (such as a radial artery or femoral artery occlusion) is a true medical emergency and needs to be diagnosed immediately.

Figure 5:
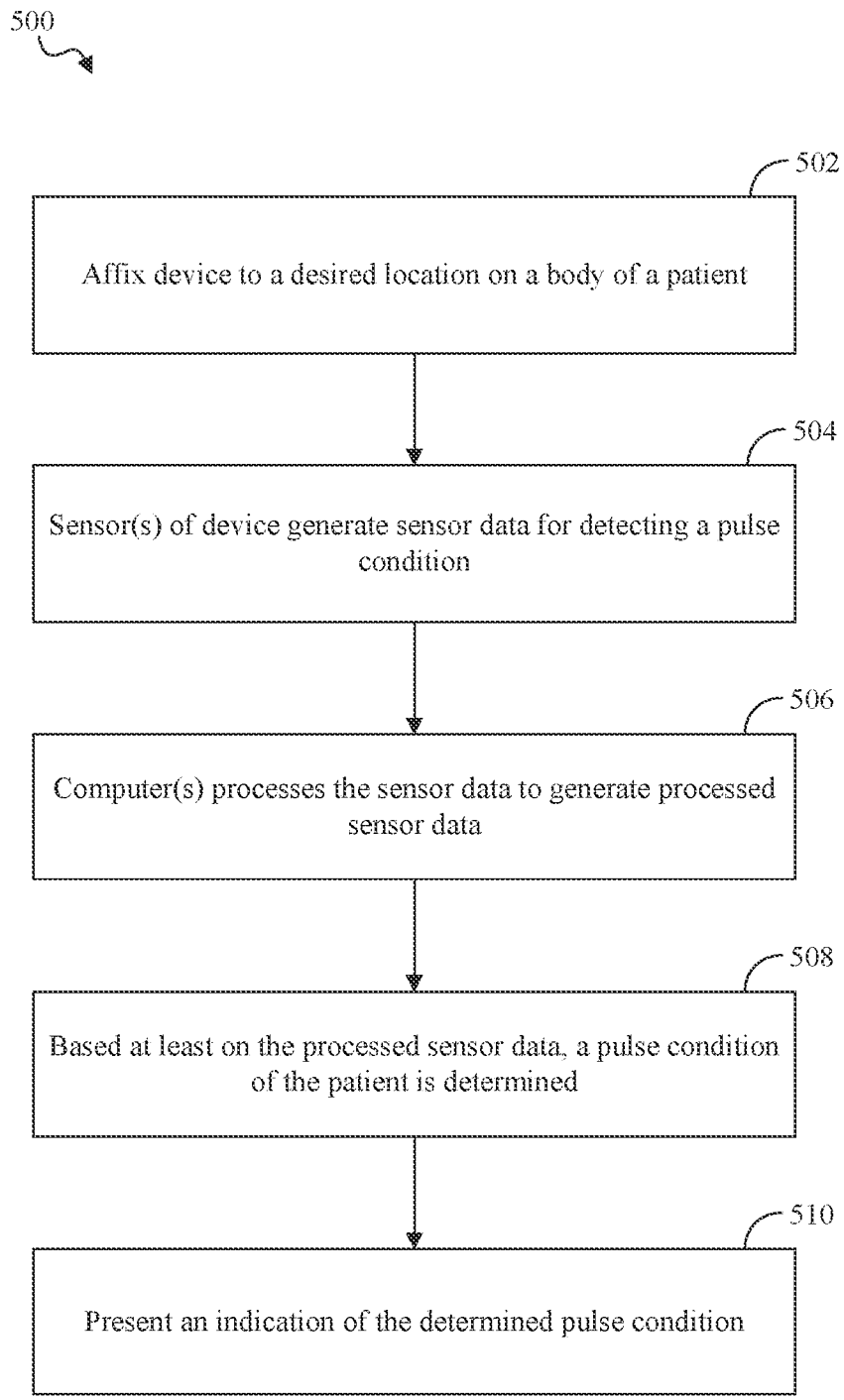
FIG. 5 depicts a flowchart of a method for detecting a pulse condition of a patient in accordance with an embodiment.

FIG. 5 depicts a flowchart 500 of a method for detecting a pulse condition of a patient in accordance with an exemplary embodiment. As shown in FIG. 5, the method of flowchart 500 begins at step 502 in which device 100 is affixed (e.g., by a practitioner) to a desired location on a body (e.g., on the skin) of a patient. As noted above, an adhesive layer 112 and/or various other means of attachment (e.g., suction, cuffs, bands, ties, sprays, gravity, clips) may be used to secure device 100 to a desired body location.

In embodiments, the size and flexibility of device 100 render it suitable for attachment to most locations on a body of a patient. In embodiments, device 100 may be suitable for attachment to any location on a patient's body, but in accordance with particular embodiments, device 100 can be attached at least over the superficial aspects of the dorsalis pedis (DP) artery (along the dorsal aspect of the foot) and the posterior tibial (PT) artery (posterior to the medial malleolus). By way of further example, device 100 may be placed along the popliteal artery (posterior to the knee in the popliteal fossa) and/or femoral artery (mid to medial aspect of the inguinal ligament (commonly the groin)). Device 100 may also be placed on the chest (possibly near the Point of Maximal Impulse (PMI)), over a carotid artery, over a femoral artery, or over a radial artery. The location of attachment of device 100 can yield different advantages. In some instances, the placement of device 100 may allow the determination of point of occlusion along the lower or upper extremity for example. Device 100 may be suitable for attachment to a body surface over or adjacent to an underlying vascular structure.

At step 504, after device 100 has been affixed to a location in step 502, one or more sensors of device 100 (e.g., sensor 402) generate sensor data for detecting a pulse condition. Such sensor(s) may include, but are not limited to, a multi-axis accelerometer, a multi-axis gyroscope, an IMU (e.g., that incorporates a multi-axis accelerometer and gyroscope), an acoustic sensor, a magnetometer, or any other type of sensor deemed suitable for detecting a pulse condition in a patient.

At step 506, the sensor data generated during step 504 is provided to one or more computer(s) and such computer(s) process the sensor data to generate processed sensor data. The computer(s) used to process the sensor data may be located on device 100 (e.g., in the form of microcontroller 408) or may be located externally with respect to device 100, in which case the sensor data generated during step 504 may be transmitted thereto via a wired or wireless connection. Still further, the processing of sensor data may be carried out in a distributed manner by a computer located on device 100 and one or more external computers. Various system implementations that rely on external computers for processing the sensor data will be described below in reference to FIG. 6.

The processing of the sensor data during step 504 may be carried out, for example, to address the issue of background noise, which can originate from a variety of sources in the clinical setting and can reduce overall accuracy of pulse readings. Such background noise may result from surface-level movements of the patient's body, both direct and indirect, as well active electronic monitoring, such as electrocardiograms (ECGs), cardiac monitors, pacemaker/defibrillator pads, and ultrasounds. Background noise can lead to significant rates of false positives where a perceived pulse detection is actually interference with the patient anatomy, such as simply lifting the patient's arm. Background noise can be addressed at least in part through the choice of sensor(s) that generate the sensor data in step 504. However, in embodiments, the issue of background noise is alternatively or additionally addressed through appropriate processing of the sensor data in step 506. For example, the computer(s) that process the sensor data may filter and/or compensate for background noise to reduce such false positive readings. In the case of filtering through sensor selection, complementary sensors that are vulnerable to noise in different domains can be used together to extract the target signal. Processing of the sensor data (e.g., analog or digital signal representations) may also be performed in either or both the time and frequency domains. Strategies may include, but are not limited to, pattern matching with expected heartbeat waveforms, filtering based on key heartbeat waveform attributes (duration, amplitude, etc.), and filtering of key frequencies in the frequency domain.

Filtering of the sensor data in the time domain may include, for example and without limitation, removing noise that is far from an expected heartbeat. For example, in a scenario in which an accelerometer is used, such noise can be removed if there is a large spike in acceleration, which may be more likely due to movement (e.g., a cough) other than a heartbeat. An embodiment can also filter out the effects of movements that are unlike a heartbeat in terms of duration. For example, if there is a spike that lasts much longer than expected, it may be the patient breathing, rather than a heartbeat. The processing can be adjusted to greater and lesser extents depending on what is being looked for in terms of shape and amplitude of a target signal.

Filtering of the sensor data in the frequency domain may include, for example and without limitation, cleaning up a sensor-generated signal with band pass filters, by analyzing dominant frequencies in the signal, or the like. In some embodiments, a combination of filtering in the time domain and filtering in the frequency domain may be used to generate the processed sensor data.

Processing of the sensor data in step 506 may alternatively or additionally comprise comparing and/or combining sensor data generated by multiple different sensors of device 100 or comparing and/or combining sensor data generated by the sensor(s) of device 100 with sensor data provided from other devices that are attached to the patient. An example system that can process sensor data generated by multiple different devices that are simultaneously attached to a patient will be described below in reference to FIG. 6.

The aforementioned processing of the sensor data in step 504 can enhance the ability of device 100 or of a system including device 100 to detect a pulse condition in a patient, including a subpulse.

At step 508, a pulse condition of the patient is determined based at least on the processed sensor data. This step may be performed, for example, by any of the same computer(s) used to process the sensor data in step 506, or by a different computer that receives the processed sensor data therefrom. The determined pulse condition may include, for example and without limitation, a presence or absence of a pulse, a characteristic of a detected pulse (e.g., pulse strength), or a characteristic or condition determinable based on a detected pulse or absence thereof (e.g., heart rate, or presence of an occlusion).

At step 510, an indication of the determined pulse condition is provided (e.g., to a practitioner). For example, a visual and/or auditory indication of the determined pulse condition of the patient can be provided to a practitioner by one or more suitable user interface components of device 100, and/or by one or more suitable user interface components external to device 100.

For example, device 100 may include one or more LED indicators as discussed above in reference to FIG. 3 and such LED indicators may be used to visually indicate a determined pulse condition of a patient. For instance, illumination of a green LED indicator may indicate that a pulse has been detected while illumination of a red LED indicator may indicate that no pulse has been detected. Blinking vs. steady illumination of an LED indicator may also be used to distinguish between detection and non-detection of a pulse. A relatively strong pulse may be indicated by illuminating more LED indicators than would be illuminated for a relatively weak pulse. Likewise, a relatively strong pulse may be indicated by a brighter illumination of an LED indicator while a relatively weak pulse may be indicated by a dimmer illumination of the LED indicator. Furthermore, an LED indicator may be illuminated in a periodic manner that mimics a detected pulse (e.g., with the LED indicator lighting up for each beat of the pulse). However, these are only examples, and persons skilled in the relevant art(s) will appreciate that any of a variety of LED indicator features (e.g., color, illumination pattern, degree of illumination, and/or number of LEDs activated) can be used to indicate a determined pulse condition to a practitioner.

In another example embodiment, device 100 may include a mini- or micro-speaker that is capable of emitting an auditory indicator of a pulse condition. For example, the speaker may emit a sound only if a pulse has been detected. As another example, the speaker may emit a first sound to indicate that a pulse is detected and emit a second sound to indicate that a pulse has not been detected. As yet another example, the speaker may emit sounds that mimic a perceived pulse of the patient upon detection.

In a further example embodiment, a visual and/or auditory indication of the detected pulse condition may be displayed via a display screen and/or speaker associated with an external computer to which device 100 is communicatively coupled via a wireless or wired communication medium.

Figure 6:
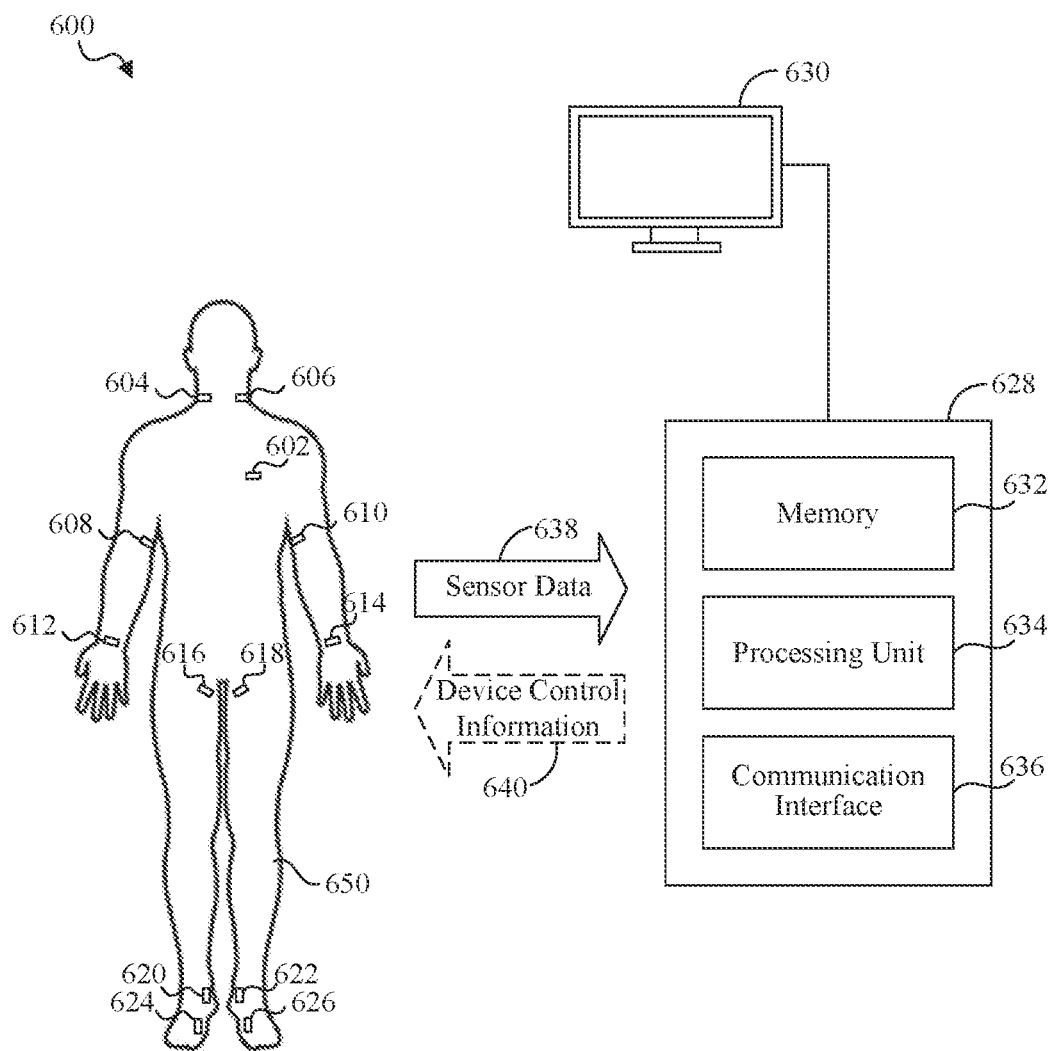
FIG. 6 illustrates a system for providing detection of a pulse condition of a patient in accordance with an embodiment.

FIG. 6 depicts a system 600 for providing detection of a pulse condition of a patient in accordance with an embodiment. As shown in FIG. 6, system 600 includes a plurality of patient-wearable devices (i.e., patient-wearable devices 602, 604, 606, 608, 610, 612, 614, 616, 618, 620, 622, 624 and 626) that are concurrently attached to different locations on a body of a patient 650, a computing device 628, and a display device 630.

As further shown in FIG. 6, computing device 628 comprises memory 632, a processing unit 634, and a communication interface 636. Memory 632 may comprise, for example, one or more volatile memory devices (e.g., one or more RAM devices) and/or one or more non-volatile memory devices (e.g., one or more ROM devices, flash memory devices, magnetic storage devices, optical disks, or the like). Processing unit 634 may comprise one or more microprocessors, microcontrollers, DSPs, and/or ASICs. Processing unit 634 may be configured to execute software instructions stored in memory 632 to perform any of the operations attributed to computing device 628 as described herein (e.g., processing of sensor data to generate processed sensor data, the detection of a pulse condition based on sensor data, and/or the generation of a visual or auditory indication of the detected pulse condition). Communication interface 636 may comprise a wired communication interface (e.g., a USB interface) and/or a wireless communication interface (e.g., a Bluetooth®, WiFi® or other RF interface) suitable for receiving sensor data 638 from one, some or all of the wearable devices shown in FIG. 6, and for optionally transmitting device control information 640 to one, some or all of the wearable devices shown in FIG. 6. Display device 630 may comprise a part of computing device 628 (e.g., integrated into a same housing as computing device 628) or may be separate from computing device 628 but connected thereto via a suitable wired or wireless connection.

Each of the patient-wearable devices in FIG. 6 may be implemented in a like manner to device 100 as discussed above. Furthermore, each such device may be capable of transmitting unprocessed and/or processed sensor data 638 to computing device 628 via a wired or wireless connection. Computing device 628 may receive such sensor data 638, e.g., via communication interface 636, and utilize such sensor data 638 to detect a pulse condition in patient 650 (e.g., a pulse condition for each one of the patient-wearable devices). Computing device 628 may then provide an indication of each one of the detected pulse conditions to a practitioner. For example, computing device 628 may cause a visual indication of each one of the detected pulse conditions to be displayed (e.g., concurrently) by display device 630.

The patient-wearable devices may thus be considered additive in nature and can be placed as desired throughout the anatomy of a patient (e.g., patient 650) to perform a specific sensing task. The ability to concurrently detect pulse conditions at different body locations may be particularly beneficial in situations of cardiac arrest and other critical conditions for which rapid pulse detection (or lack thereof) is pivotal. For example, different patient-wearable devices may be concurrently attached to the chest (possibly near the Point of Maximal Impulse (PMI)), over a carotid artery, over a femoral artery, and/or over a radial artery. Several points of contact may increase sensitivity and specificity and allow for additional clinical decisions based on data points and calculations. For example, an aortic dissection may be indicated if pulse strength readings from patient-wearable devices placed on the left side of body are different than pulse strength readings from patient-wearable devices placed on the right side of the body. Multiple points of body contact may increase accuracy and also allow real time data to be collected for oxygenation levels, body temperature, respiratory rate, and change in blood pressure.

In an embodiment, each of the patient-wearable devices shown in FIG. 6 transmits unprocessed sensor data to computing device 628 via communication interface 636, and processing unit 634 of computing device 628 processes and interprets the sensor data to detect a pulse condition. Processing unit 634 then generates a perceptible indication of the pulse condition for presentation to a practitioner, such as a visual indicator for presentation via display 630 or an auditory indicator for emitting via a speaker integrated with or connected to computing device 628 (not shown in FIG. 6).

In a further embodiment, as each patient-wearable device is activated and placed for use on patient 650, any additional sensor data generated thereby is sent to computing device 628, which combines it with other sensor data and interprets the combined sensor data to generate and present a result (e.g., a perceptible indication of a pulse condition of patient 650). The sensor data may be transmitted to computing device 628 by each patient-wearable device may include an identifier of the patient-wearable device from which it originated. Computing device 628 may be configured to dynamically switch from operating with a single patient wearable-device to operating with multiple patient-wearable devices as new streams of sensor data are received.

In one embodiment of the system shown in FIG. 6, the patient-wearable devices all possess the same type of sensor and thus generate the same type of sensor data. However, in an alternate embodiment, the patient-wearable devices possess different types of sensors and thus generate different types of sensor data. For example, some of the patient-wearable devices shown in FIG. 6 may include an IMU but not an acoustic sensor, while other ones of the patient-wearable devices shown in FIG. 6 may include an acoustic sensor but not an IMU. Furthermore, some of the patient-wearable devices shown in FIG. 6 may include sensors for detecting qualities of the patient other than the presence of a pulse (e.g., blood pressure, blood sugar, blood oxygen, echocardiogram, body temperature, respiratory rate, blood flow rate), while other ones of the patient-wearable devices shown in FIG. 6 may not include such sensors. In further accordance with such embodiments, each patient-wearable device may include an identifier of the type of sensor used to generate the sensor data when transmitting the sensor data to computing device 628.

In one embodiment of system 600, each of the patient-wearable devices is capable of one-way communication with computing device 628 and utilizes such one-way communication to send sensor data 638 thereto. In an alternate embodiment, each of the patient-wearable devices is capable of two-way communication with computing device 628. For example, in accordance with such an embodiment, each of the patient-wearable devices is capable of sending sensor data 638 to computing device 628 and is also capable of receiving device control information 640 therefrom. Different ones of the patient-wearable devices may utilize different frequency bands and/or different time periods to communicate with computing device 628 so as to avoid interference.

Device control information 640 may comprise any information sent by computing device 628 to control the operation of any one of the patient-wearable devices. For example, in an embodiment, the patient-wearable devices may be designed to operate in a sleep mode (e.g., low power consumption mode) to preserve power of a battery included therein, thereby enabling the device operate over a longer period of time. For example, during sleep mode, the generation and/or transmission of sensor data may be disabled. In further accordance with such an embodiment, computing device 628 may send a "sleep" command to any one of the patient-wearable devices to place the device into sleep mode and also send a "wake" command to the device to cause it to resume generating and transmitting sensor data. Such a feature may be particularly useful for codes, which can last from 30 to 45 minutes, to cause pulse checks to occur every two to three minutes with each active pulse check lasting up to 30 seconds. One or more patient-wearable devices may be wakened from sleep mode to perform the pulse check, and then placed back into sleep mode when the pulse check is finished.

In another embodiment, device control information 640 may include information that can assist with system function monitoring. For example, device control information 640 may include an error message that indicates that there is an error in a data stream received from a patient-wearable device, a lack of a data stream altogether, or some other issue, such that the device can take some action to rectify the issue or notify a user thereof. For example, in an embodiment in which the patient-wearable device includes one or more LED indicators, the receipt of such an error message may cause the patient-wearable device to utilize such LED indicator(s) to signal that an error condition exists.

In certain embodiments, the processing of sensor data, detection of a pulse condition, and generation of an indicator thereof may all be performed by a single patient-wearable device without the need for an external computer. In other embodiments, each patient-wearable device may include the capacity for processing sensor data as well as the ability to perform multi-way communication with one or more external computers or devices. The external computers or devices may themselves be other patient-wearable devices. In such a case, any computation necessary to process sensor data and/or determine a pulse condition may take place in a distributed manner, occurring across all the patient-wearable devices, with communication happening between them, and one or multiple ones of the patient-wearable devices may present an indication of a determined pulse condition. The determination of which patient-wearable devices perform which functions may be negotiated dynamically amongst the patient-wearable devices. Alternatively, a single patient-wearable device may be determined to be a master or primary device and the other patient-wearable devices may be determined to be slave or secondary devices, and the master/primary device may determine which slave/secondary devices perform which functions.

In a further embodiment, a particular one of the patient-wearable devices (e.g., a primary or master device) attached to a patient may collect sensor data from other patient-wearable devices attached to the patient via a short-range wireless communication protocol (e.g., Bluetooth®) or even through wired connections thereto. The particular one of the patient-wearable devices may then transmit the collected sensor data along with its own sensor data to an external computer (e.g., computing device 628) using a long-range wireless communication protocol (e.g., WiFi®), and the external computer can process the sensor data to detect one or more pulse conditions and generate indicator(s) thereof.

Figure 7:
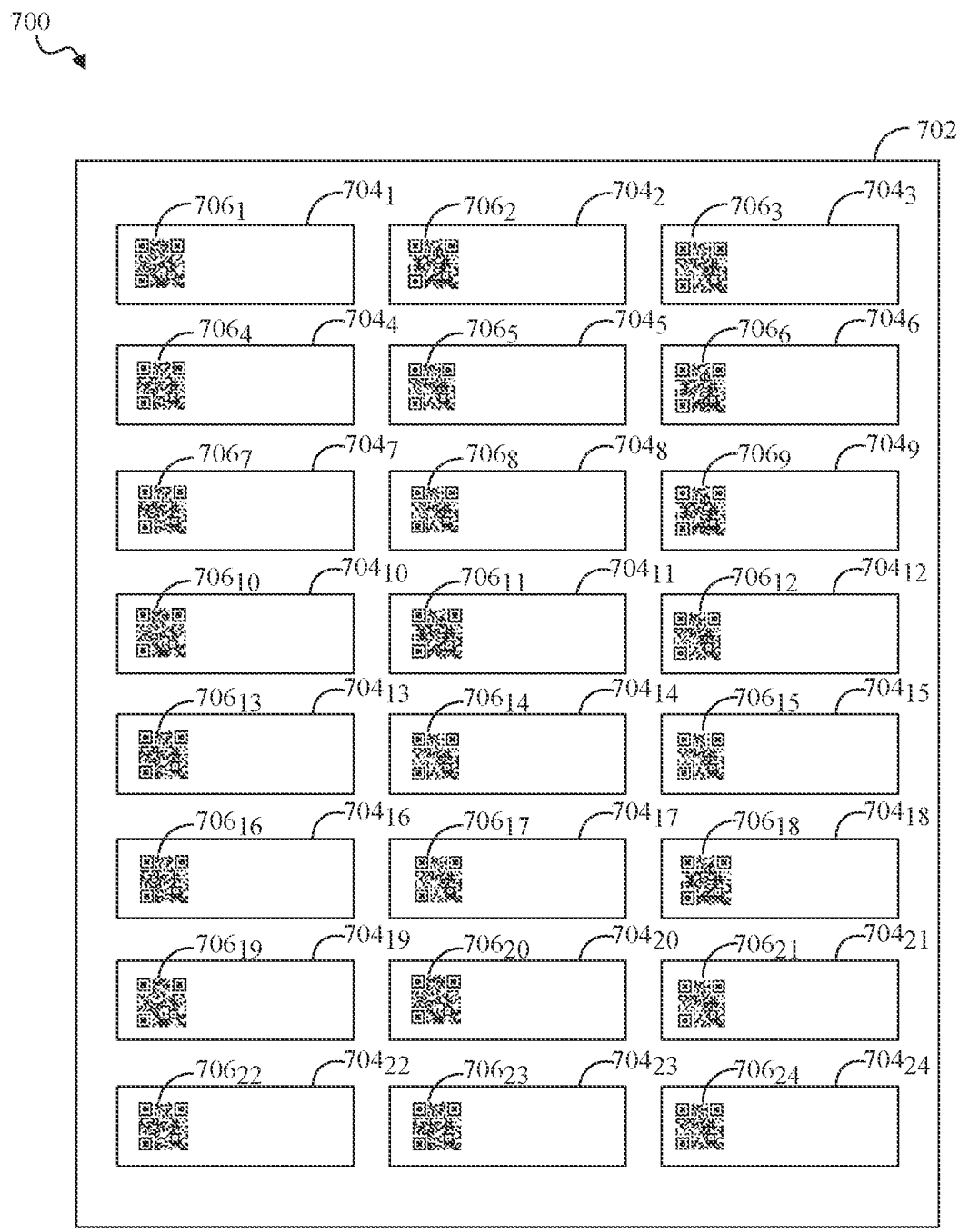
FIG. 7 depicts a sheet of patient-wearable devices for detecting a pulse condition of a patient prior to application thereof in accordance with an embodiment.

Prior to application to a patient, patient-wearable devices (such as device 100) may be stored adhesive-side down on a suitable substrate, such as a sheet or roll. For example, FIG. 7 depicts a sheet 700 of twenty-four patient-wearable devices $704_1$-$704_{24}$ in accordance with an embodiment. It will be readily understood that a different number of devices may be accommodated on a sheet depending on the size and shape of the sheet and of the respective devices. Sheet 700 comprises a backing sheet 702. Devices $704_1$-$704_{24}$ may be secured adhesive-side down to backing sheet 702 and can be removed therefrom as desired for application to the body of a patient. Backing sheet 702 may be formed from plastic, from paper coated with a suitable release agent (e.g., silicone, polyethylene terephthalate (PET) plastic resin, or polypropylene plastic resin), or from any other materials suitable for facilitating easy removal of devices $704_1$-$704_{24}$ therefrom with the corresponding adhesive layer substantially intact.

As shown in FIG. 7, each device $704_1$-$704_{24}$ has a corresponding (e.g., unique) identifier $706_1$-$706_{24}$ printed thereon. In the example of FIG. 7, the identifier comprises a barcode but any type of identifier may be used. Such identifier can be scanned prior to, during, or after use of a patient-wearable device to associate it with a particular patient. If the patient-wearable device includes an internal battery, a battery preservation mechanism can be utilized while the device sits dormant. For example, as a patient-wearable device is removed from its respective sheet, roll, or other storage location, a small tab can be pulled on the device that allows the battery to make contact with the rest of the device, powering it on. In another embodiment, the act of separating the patient-wearable device from the sheet or roll or scanning the corresponding identifier has the effect of powering on the device. Still other methods and mechanisms for powering on a patient-wearable device may be used.

Figure 8:
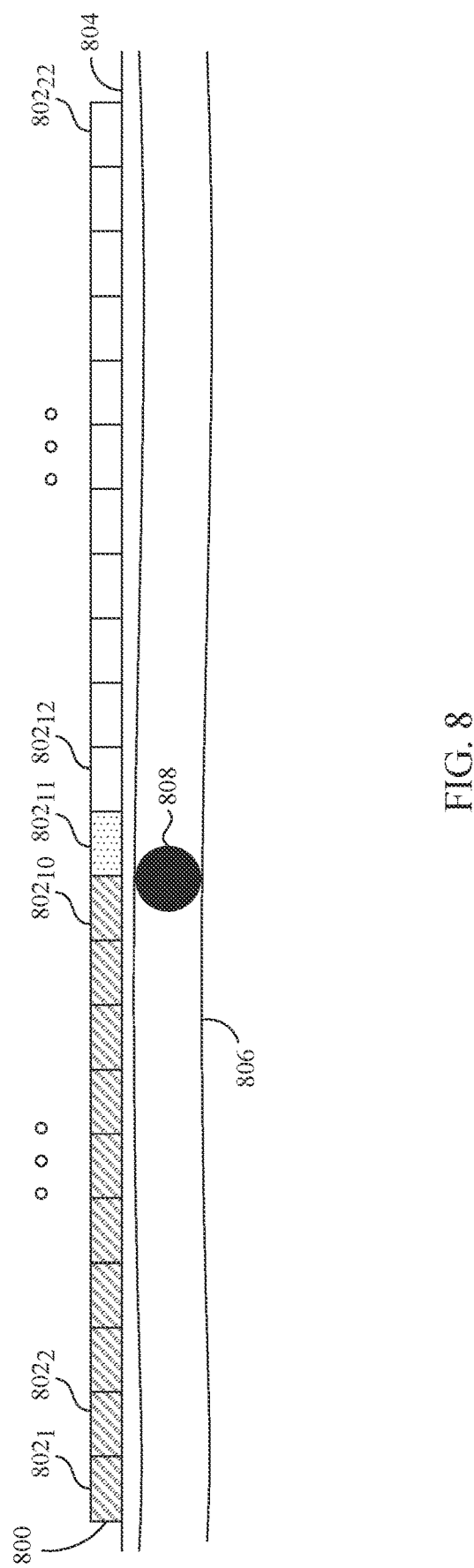
FIG. 8 illustrates a side view of a patient-wearable device for detecting a pulse condition of a patient in accordance with an embodiment.

In certain embodiments, a patient-wearable device may provide a comparative grade of pulse strength along its length or on its structure. For example, FIG. 8 illustrates a side view of a patient-wearable device 800 in accordance with such an embodiment. As shown in FIG. 8, device 800 is applied to the skin 804 of a patient at a location along an artery 806 where an arterial occlusion 808 exists. In the example of FIG. 8, device 800 comprises twenty-two sensing modules $802_1$-$802_{22}$, although a smaller or greater number of modules may be included as deemed necessary or desirable. Each of the sensing modules $802_1$-$802_{22}$ may include one or more sensors to generate sensor data, a processing unit (e.g., microcontroller, microprocessor, DSP and/or ASIC) to process the sensor data and determine a pulse strength therefrom, and a visual indicator (e.g., LED indicator or the like) of the determined pulse strength. However, in an alternate embodiment, a sensing module may utilize a single sensor and/or processing unit for driving multiple visual indicators across its length. For example, a detection area of a sensor may be such that it can drive multiple visual indicators along its length to indicate pressure change across the span from beginning to end of the sensor.

In the example shown in FIG. 8, the visual indicators of sensing modules $802_{12}$-$802_{22}$ on device 800 proximal to occlusion 808 signify detection of a pulse (e.g., by showing a relatively bright illumination or by illuminating a green light) in the patient, while the visual indicators of sensing modules $802_1$-$802_{10}$ associated with the distal aspect of artery 806 signify no pulse (e.g., by showing no illumination or by illuminating a red light). The transition between the two suggests the location over the occlusion, which is further be signified by a visual indicator of sensing module $802_{11}$ (e.g., by showing an intermediate level of illumination or by illuminating a yellow light). This embodiment of FIG. 8 thus allows for obstruction location detection by a medical provider.

III. Example Computer System Implementation

Figure 9:
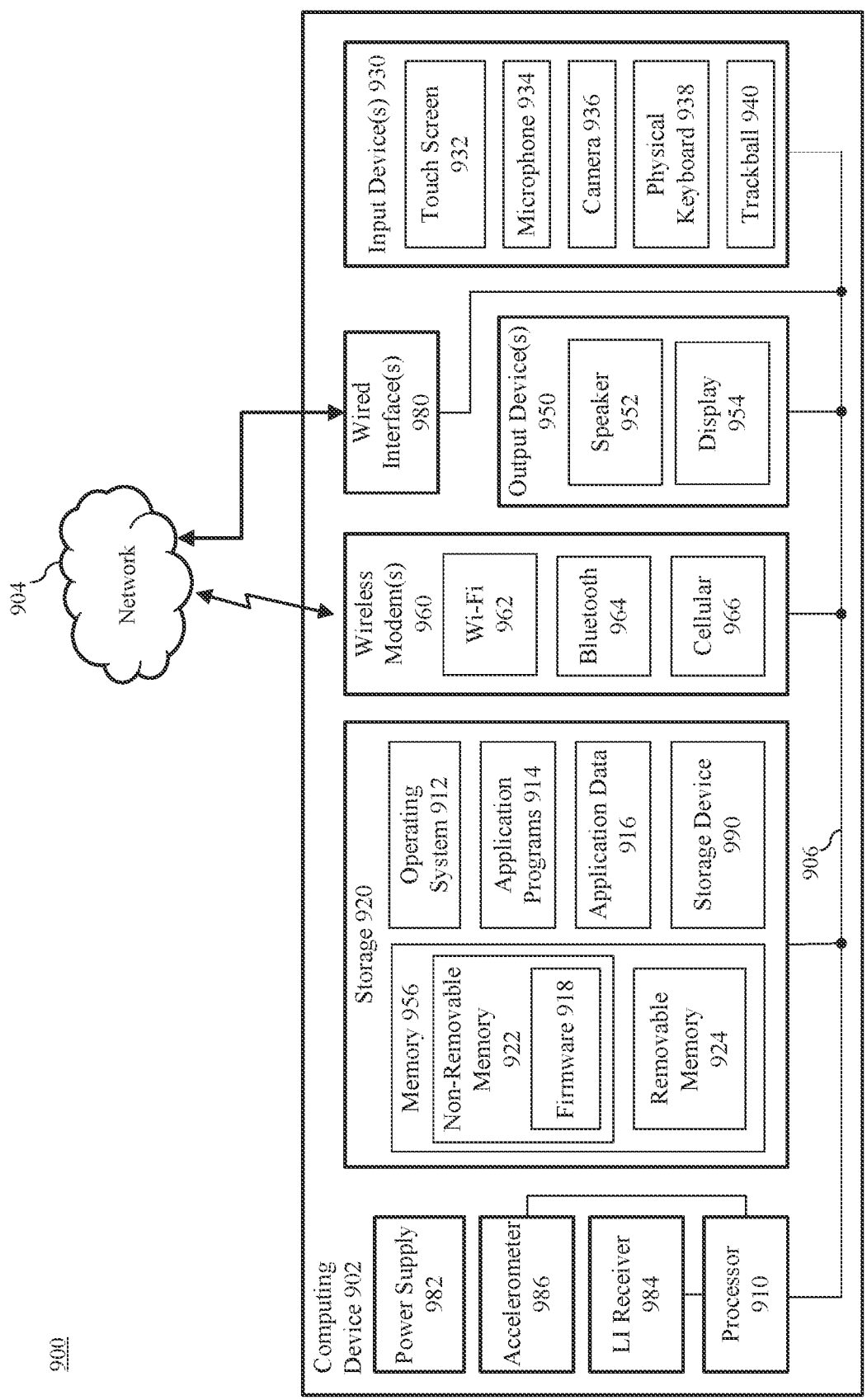
FIG. 9 depicts an exemplary implementation of a computing device that may be used to implement embodiments described herein.

Examples of computing devices in which embodiments may be implemented are described as follows with respect to FIG. 9. FIG. 9 shows a block diagram of an exemplary computing environment 900 that includes a computing device 902. Computing device 902 is an example of computing device 628 of FIG. 6, which may include one or more of the components of computing device 902. In some embodiments, computing device 902 is communicatively coupled with devices (not shown in FIG. 9) external to computing environment 900 via network 904. Network 904 comprises one or more networks such as local area networks (LANs), wide area networks (WANs), enterprise networks, the Internet, etc., and may include one or more wired and/or wireless portions. Network 904 may additionally or alternatively include a cellular network for cellular communications. Computing device 902 is described in detail as follows Computing device 902 can be any of a variety of types of computing devices. For example, computing device 902 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 902 may alternatively be a stationary computing device such as a desktop computer, a personal computer (PC), a stationary server device, a minicomputer, a mainframe, a supercomputer, etc.

As shown in FIG. 9, computing device 902 includes a variety of hardware and software components, including a processor 910, a storage 920, one or more input devices 930, one or more output devices 950, one or more wireless modems 960, one or more wired interfaces 980, a power supply 982, a location information (LI) receiver 984, and an accelerometer 986. Storage 920 includes memory 956, which includes non-removable memory 922 and removable memory 924, and a storage device 990. Storage 920 also stores an operating system 912, application programs 914, and application data 916. Wireless modem(s) 960 include a Wi-Fi modem 962, a Bluetooth modem 964, and a cellular modem 966. Output device(s) 950 includes a speaker 952 and a display 954. Input device(s) 930 includes a touch screen 932, a microphone 934, a camera 936, a physical keyboard 938, and a trackball 940. Not all components of computing device 902 shown in FIG. 9 are present in all embodiments, additional components not shown may be present, and any combination of the components may be present in a particular embodiment. These components of computing device 902 are described as follows.

A single processor 910 (e.g., central processing unit (CPU), microcontroller, a microprocessor, signal processor, ASIC (application specific integrated circuit), and/or other physical hardware processor circuit) or multiple processors 910 may be present in computing device 902 for performing such tasks as program execution, signal coding, data processing, input/output processing, power control, and/or other functions. Processor 910 may be a single-core or multi-core processor, and each processor core may be single-threaded or multithreaded (to provide multiple threads of execution concurrently). Processor 910 is configured to execute program code stored in a computer readable medium, such as program code of operating system 912 and application programs 914 stored in storage 920. Operating system 912 controls the allocation and usage of the components of computing device 902 and provides support for one or more application programs 914 (also referred to as "applications" or "apps"). Application programs 914 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 902 can communicate with any other component according to function, although not all connections are shown for ease of illustration. For instance, as shown in FIG. 9, bus 906 is a multiple signal line communication medium (e.g., conductive traces in silicon, metal traces along a motherboard, wires, etc.) that may be present to communicatively couple processor 910 to various other components of computing device 902, although in other embodiments, an alternative bus, further buses, and/or one or more individual signal lines may be present to communicatively couple components. Bus 906 represents one or more of any of several types of bus structures, including a memory bus or memory controller, a peripheral bus, an accelerated graphics port, and a processor or local bus using any of a variety of bus architectures.

Storage 920 is physical storage that includes one or both of memory 956 and storage device 990, which store operating system 912, application programs 914, and application data 916 according to any distribution. Non-removable memory 922 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 922 may include main memory and may be separate from or fabricated in a same integrated circuit as processor 910. As shown in FIG. 9, non-removable memory 922 stores firmware 918, which may be present to provide low-level control of hardware. Examples of firmware 918 include BIOS (Basic Input/Output System, such as on personal computers) and boot firmware (e.g., on smart phones). Removable memory 924 may be inserted into a receptacle of or otherwise coupled to computing device 902 and can be removed by a user from computing device 902. Removable memory 924 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 990 may be present that are internal and/or external to a housing of computing device 902 and may or may not be removable. Examples of storage device 990 include a hard disk drive, a SSD, a thumb drive (e.g., a USB (Universal Serial Bus) flash drive), or other physical storage device.

One or more programs may be stored in storage 920. Such programs include operating system 912, one or more application programs 914, and other program modules and program data. Examples of such application programs may include, for example, computer program logic (e.g., computer program code/instructions) for implementing any of the functions ascribed herein to computing device 628, as well as any of steps 506, 508 or 510 of flowchart 500 as previously described herein.

Storage 920 also stores data used and/or generated by operating system 912 and application programs 914 as application data 916. Examples of application data 916 include web pages, text, images, tables, sound files, video data, and other data, which may also be sent to and/or received from one or more network servers or other devices via one or more wired or wireless networks. Storage 920 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 902 through one or more input devices 930 and may receive information from computing device 902 through one or more output devices 950. Input device(s) 930 may include one or more of touch screen 932, microphone 934, camera 936, physical keyboard 938 and/or trackball 940 and output device(s) 950 may include one or more of speaker 952 and display 954.

Each of input device(s) 930 and output device(s) 950 may be integral to computing device 902 (e.g., built into a housing of computing device 902) or external to computing device 902 (e.g., communicatively coupled wired or wirelessly to computing device 902 via wired interface(s) 980 and/or wireless modem(s) 960). Further input devices 930 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 954 may display information, as well as operating as touch screen 932 by receiving user commands and/or other information (e.g., by touch, finger gestures, virtual keyboard, etc.) as a user interface. Any number of each type of input device(s) 930 and output device(s) 950 may be present, including multiple microphones 934, multiple cameras 936, multiple speakers 952, and/or multiple displays 954.

One or more wireless modems 960 can be coupled to antenna(s) (not shown) of computing device 902 and can support two-way communications between processor 910 and devices external to computing device 902 through network 904, as would be understood to persons skilled in the relevant art(s). Wireless modem 960 is shown generically and can include a cellular modem 966 for communicating with one or more cellular networks, such as a GSM network for data and voice communications within a single cellular network, between cellular networks, or between the mobile device and a public switched telephone network (PSTN). Wireless modem 960 may also or alternatively include other radio-based modem types, such as a Bluetooth modem 964 (also referred to as a "Bluetooth device") and/or Wi-Fi 962 modem (also referred to as an "wireless adaptor"). Wi-Fi modem 962 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 964 is configured to communicate with another Bluetooth-capable device according to the Bluetooth short-range wireless technology standard(s) such as IEEE 802.15.1 and/or managed by the Bluetooth Special Interest Group (SIG).

Computing device 902 can further include power supply 982, LI receiver 984, accelerometer 986, and/or one or more wired interfaces 980. Example wired interfaces 980 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 980 of computing device 902 provide for wired connections between computing device 902 and network 904, or between computing device 902 and one or more devices/peripherals when such devices/peripherals are external to computing device 902 (e.g., a pointing device, display 954, speaker 952, camera 936, physical keyboard 938, etc.). Power supply 982 is configured to supply power to each of the components of computing device 902 and may receive power from a battery internal to computing device 902, and/or from a power cord plugged into a power port of computing device 902 (e.g., a USB port, an A/C power port). LI receiver 984 may be used for location determination of computing device 902 and may include a satellite navigation receiver such as a Global Positioning System (GPS) receiver or may include other type of location determiner configured to determine location of computing device 902 based on received information (e.g., using cell tower triangulation, etc.). Accelerometer 986 may be present to determine an orientation of computing device 902.

Note that the illustrated components of computing device 902 are not required or all-inclusive, and fewer or greater numbers of components may be present as would be recognized by one skilled in the art. For example, computing device 902 may also include one or more of a gyroscope, barometer, proximity sensor, ambient light sensor, digital compass, etc. Processor 910 and memory 956 may be co-located in a same semiconductor device package, such as being included together in an integrated circuit chip, FPGA, or system-on-chip (SOC), optionally along with further components of computing device 902.

In embodiments, computing device 902 is configured to implement any of the above-described features of flowcharts herein. Computer program logic for performing any of the operations, steps, and/or functions described herein may be stored in storage 920 and executed by processor 910.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 920. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 914) may be stored in storage 920. Such computer programs may also be received via wired interface(s) 980 and/or wireless modem(s) 960 over network 904. Such computer programs, when executed or loaded by an application, enable computing device 902 to implement features of embodiments discussed herein. Accordingly, such computer programs represent controllers of the computing device 902.

Embodiments are also directed to computer program products comprising computer code or instructions stored on any computer-readable medium or computer-readable storage medium. Such computer program products include the physical storage of storage 920 as well as further physical storage types.

IV. Conclusion

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system for determining a pulse condition of a patient based on detection of a subpulse thereof, comprising:
    a first patient-wearable device for attachment to a first location on a body of the patient, the first patient-wearable device comprising a first accelerometer; and
    a second patient-wearable device for attachment to a second location on the body of the patient, the second patient-wearable device comprising:
        a base layer comprising a printed circuit board (PCB);
        electronics connected to the PCB, the electronics comprising:
            a second accelerometer;
            a computer that is connected to at least the second accelerometer and processes at least first sensor data generated by the first accelerometer and second sensor data generated by the second accelerometer to detect a presence of the subpulse of the patient, wherein the subpulse corresponds to a systolic blood pressure less than 60 millimeters of mercury (mmHg), wherein the first accelerometer and the second accelerometer have sensitivities suitable to detect the subpulse; and
            a user interface component that is connected to the computer and controlled thereby to generate a user-perceptible indication of the pulse condition; and
        an adhesive layer that is coupled to the base layer, the adhesive layer comprising an adhesive suitable for attaching the second patient-wearable device to the second location on the body of the patient.

2. The system of claim 1, wherein the second patient-wearable device further comprises an overlay that is disposed on the base layer.

3. The system of claim 2, wherein the user interface component is disposed on top of or in a cavity formed in the overlay and connected through the overlay to the PCB.

4. The system of claim 1, wherein the PCB comprises a flexible PCB that substantially comprises the entire base layer.

5. The system of claim 4, wherein the flexible PCB comprises a stiffener in a region of the flexible PCB to which the electronics are connected.

6. The system of claim 1, wherein the base layer comprises a flexible base sheet and the PCB is disposed on top of or surrounded by the flexible base sheet.

7. The system of claim 1, wherein the user interface component comprises one or more light emitting diode (LED) indicators.

8. The system of claim 1, wherein the user interface component comprises one or more mini-speakers or micro-speakers.

9. The system of claim 1, wherein the computer comprises a microcontroller.

10. The system of claim 1, wherein the computer processes at least the first sensor data generated by the first accelerometer to detect the presence of the subpulse of the patient by:
    filtering the first sensor data generated by the first accelerometer in one or more of the time domain and the frequency domain to generate filtered sensor data; and
    determining the pulse condition of the patient based on the filtered sensor data and the second sensor data.

11. The system of claim 1, wherein the adhesive layer comprises an adhesive pad or film.

12. The system of claim 1, wherein, to detect the presence of the subpulse at the first location on the body of the patient, the computer processes a combination of the first sensor data and the second sensor data.

13. A system for determining a pulse condition of a patient based on detection of a subpulse, comprising:
    a first patient-wearable device configured to attach to a first location on a body of the patient and to determine the pulse condition of the patient based on detection of the subpulse at the first location on the body of the patient, the first patient-wearable device comprising:
        a base layer comprising a printed circuit board (PCB);
        electronics connected to the PCB, the electronics comprising:
            at least a first accelerometer; and
            a first communication interface that is connected to at least the first accelerometer and that transmits first sensor data generated by at least the first accelerometer to a computing device; and
        an adhesive layer that is coupled to the base layer, the adhesive layer comprising an adhesive that is configured to attach the first patient-wearable device to the first location on the body of the patient;
    a second patient-wearable device configured to attach to a second location on the body of the patient, the second patient-wearable device comprising:
        at least a second accelerometer; and
        a second communication interface that is connected to at least the second accelerometer and that transmits second sensor data generated by at least the second accelerometer to the computing device; and the computing device, comprising:
        a third communication interface that receives the first sensor data generated by at least the first accelerometer and the second sensor data generated by at least the second accelerometer and transmitted to the computing device by the first patient-wearable device and the second patient-wearable device, respectively; and
        a processing unit configured to:
            process at least the first sensor data generated by at least the first accelerometer and the second sensor data generated by at least the second accelerometer to detect the presence of the subpulse of the patient at the first location on the body of the patient, wherein the subpulse corresponds to a systolic blood pressure less than 60 millimeters of mercury (mmHg), wherein the first accelerometer and the second accelerometer have sensitivities suitable to detect the subpulse; and
            cause a user-perceptible indication of the pulse condition to be generated for presentation to a user.

14. The system of claim 13, wherein the first communication interface, the second communication interface, and the third communication interface comprise:
    wired interfaces; or
    wireless interfaces.

15. The system of claim 13, wherein the processing unit processes the first sensor data generated by at least the first accelerometer to detect the presence of the subpulse of the patient by:
    filtering the first sensor data generated by at least the first accelerometer in one or more of the time domain and the frequency domain to generate filtered first sensor data; and
    determining the pulse condition of the patient based on the filtered first sensor data and the second sensor data.

16. The system of claim 13, wherein the processing unit is further configured to:
send device control information to the first patient-wearable device to control an operation of the first patient-wearable device.

17. The system of claim 16, wherein the device control information comprises:
a command to put the first patient-wearable device in a low power consumption mode;
a command to wake the first patient-wearable device from the low power consumption mode; or
an error message that causes the first patient-wearable device to take an action to rectify an issue or notify a user of the issue.

18. The system of claim 13, wherein, to detect the presence of the subpulse of the patient at the first location on the body of the patient, the processing unit processes a combination of the first sensor data and the second sensor data.

19. A system, comprising:
a first patient-wearable device that is configured to attach to a first location on a body of a patient and to determine the pulse condition of the patient based on detection of a subpulse at the first location on the body of the patient, wherein the first patient-wearable device comprises:
at least a first accelerometer; and
a communication interface that enables communication with a second patient-wearable device that is configured to attach to a second location on the body of the patient that is different than the first location; and
wherein the first patient-wearable device is configured to send first sensor data generated by at least the first accelerometer to the second patient-wearable device; and
the second patient-wearable device that is configured to attach to the second location on the body of the patient, wherein the second patient-wearable device comprises:
at least a second accelerometer; and
a computer that is configured to process at least the first sensor data generated by at least the first accelerometer and received from the first patient-wearable device and second sensor data generated by the second patient-wearable device to detect a presence of a subpulse of the patient at the first location on the body of the patient, wherein the subpulse corresponds to a systolic blood pressure less than 60 millimeters of mercury (mmHg), wherein the first accelerometer and the second accelerometer have sensitivities suitable to detect the subpulse.

20. The system of claim 19, wherein the computer is configured to process at least the first sensor data generated by at least the first accelerometer to detect the presence of the subpulse of the patient by:
filtering the first sensor data generated by at least the first accelerometer in one or more of the time domain and the frequency domain to generate filtered sensor data; and
detecting the presence of the subpulse of the patient based on at least the filtered sensor data and the second sensor data.

21. The system of claim 19, wherein the computer comprises a microcontroller.

22. The system of claim 19, wherein the communication interface comprises:
wired interfaces or wireless interfaces.

23. A system for determining a pulse condition of a patient based on detection of a subpulse, comprising:
a first patient-wearable device configured to attach to a first location on a body of the patient and to determine the pulse condition of the patient based on detection of the subpulse at the first location on the body of the patient, the first patient-wearable device comprising:
a base layer comprising a printed circuit board (PCB);
electronics connected to the PCB, the electronics comprising:
at least a first accelerometer; and
a first communication interface that is connected to at least the first accelerometer and that transmits first sensor data generated by at least the first accelerometer to a computing device; and
an adhesive layer that is coupled to the base layer, the adhesive layer comprising an adhesive that is configured to attach the first patient-wearable device to the first location on the body of the patient;
a second patient-wearable device configured to attach to a second location on the body of the patient, the second patient-wearable device comprising:
at least a second accelerometer: and
a second communication interface that is connected to at least the second accelerometer and that transmits second sensor data generated by at least the second accelerometer to the computing device; and the computing device, comprising:
a third communication interface that receives the first sensor data generated by at least the first accelerometer and transmitted to the computing device by the first patient-wearable device and receives the second sensor data generated by at least the second accelerometer and transmitted to the computing device by the second patient-wearable device; and
a processing unit configured to:
process at least the first sensor data generated by at least the first accelerometer and second sensor data generated by at least the second accelerometer to detect the presence of the subpulse of the patient at the first location on the body of the patient, wherein the subpulse corresponds to a systolic blood pressure less than 60 millimeters of mercury (mmHg), wherein to process at least the first sensor data and the second sensor data, the processing unit is configured to process one or more of a comparison of the first sensor data and the second sensor data or a combination of the first sensor data and the second sensor data, wherein the first accelerometer and the second accelerometer have sensitivities suitable to detect the subpulse; and
cause a user-perceptible indication of the determined pulse condition to be generated for presentation to a user.

* * * * *

UNITED STATES PATENT AND TRADEMARK OFFICE
CERTIFICATE OF CORRECTION

| | | |
|---|---|---|
| PATENT NO. | : 12,446,790 B2 | Page 1 of 1 |
| APPLICATION NO. | : 18/416568 | |
| DATED | : October 21, 2025 | |
| INVENTOR(S) | : Paul Adams et al. | |

It is certified that error appears in the above-identified patent and that said Letters Patent is hereby corrected as shown below:

In the Claims

In Column 21, Line 7, in Claim 1, delete "patient." and insert -- patient, --.

In Column 21, Line 10, in Claim 1, delete "patient." and insert -- patient, --.

In Column 24, Line 28, in Claim 23, delete "accelerometer:" and insert -- accelerometer; --.

Signed and Sealed this
Thirteenth Day of January, 2026

John A. Squires
*Director of the United States Patent and Trademark Office*